Nov. 25, 1941.    T. R. CAMP    2,263,964
FILTRATION APPARATUS
Filed June 24, 1940
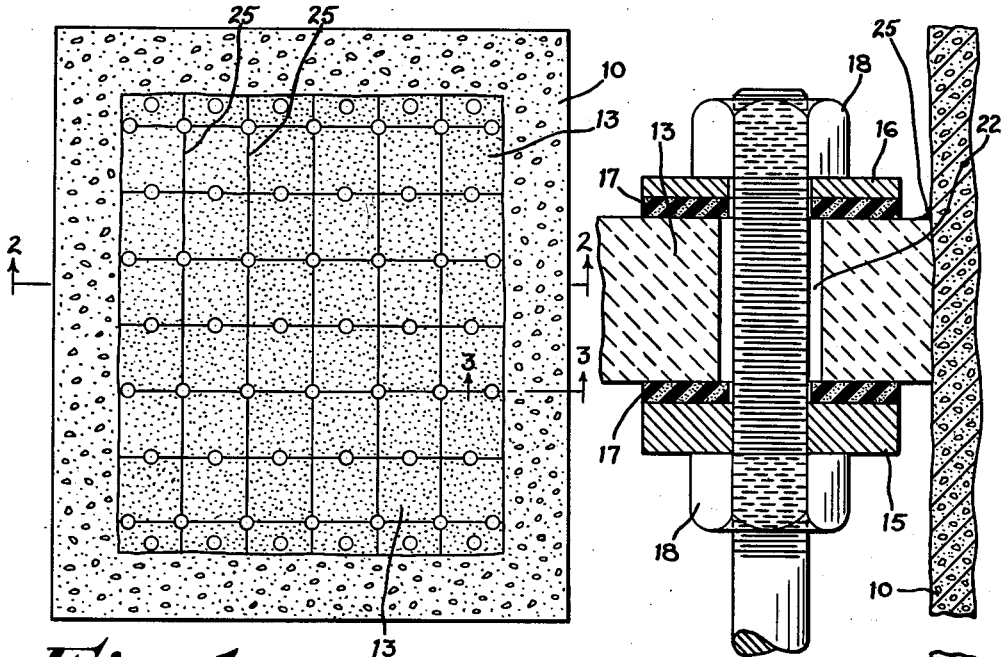
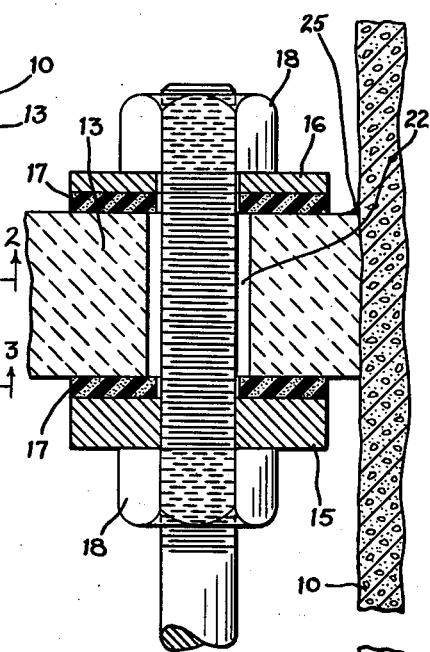
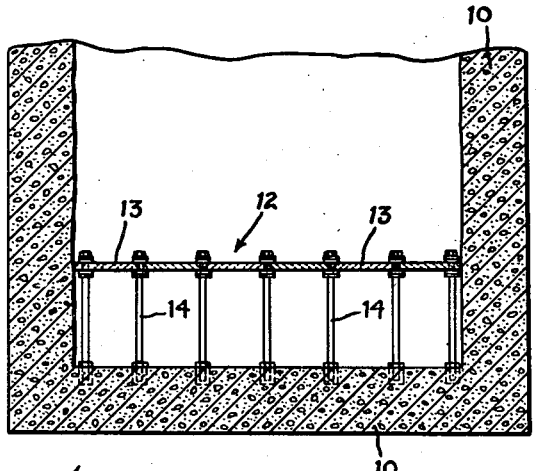
Fig.1
Fig.3
Fig.2
Inventor
THOMAS R. CAMP Patented Nov. 25, 1941

2,263,964

UNITED STATES PATENT OFFICE 2,263,964

FILTRATION APPARATUS

Thomas R. Camp, Newton, Mass.

REISSUED

Application June 24, 1940, Serial No. 342,103

JUN 29 1948

1 Claim. (Cl. 210—148)

The invention relates to filtration apparatus, and with regard to its specific features to the supports for a false bottom therefor.

One object of the invention is to provide a false bottom construction permitting porous plates to be clamped in place without danger of breakage despite irregularities of alignment. Another object of the invention is to provide a false bottom which can be rapidly constructed. Another object of the invention is to permit the porous plates to be very securely fastened in position. Another object of the invention is to improve the apparatus described in my prior Patent No. 2,043,734 granted June 9, 1936. Other objects will be in part obvious or in part pointed out hereinafter.

The invention accordingly consists in the features of construction, combinations of elements and arrangements of parts, as will be exemplified in the structure to be hereinafter described, and the scope of the application of which will be indicated in the following claim.

In the accompanying drawing in which is shown one of various possible embodiments of the mechanical features of this invention, Figure 1 is a plan view of a filtration apparatus constructed in accordance with the invention, Figure 2 is a sectional view taken on the line 2—2 of Figure 1, and Figure 3 is a sectional view on an enlarged scale, taken on the line 3—3 of Figure 1.

Referring first to Figures 1 and 2, the invention may be applied to the type of filtration apparatus illustrated and described in my prior Patent No. 2,043,734. As therein described, I provide a suitable tank 10 which will usually be a hollow rectangular parallelopiped of concrete with no top, but which may be an enclosed tank of steel or other suitable material as in "pressure filters." Supported part way up in the tank 10 is a "false bottom" 12 made of porous plates 13 which supports the filtering medium of loose granular material. The manner and means for supporting the plates 13 is more particularly the subject of the present invention.

The apparatus is equipped with suitable inlets for the unfiltered water above the filtering medium and the false bottom 12, with suitable outlets for filtered water below the false bottom 12, and with means for backwashing the filtering medium by reversal of the direction of flow of the filtered water. These may be of any preferred construction and since such are fully illustrated and described in my aforesaid patent, they will not further be described herein.

The porous plates 13 may be made of any suitable material. In the preferred form "Alundum" plates one foot square and one and one quarter inch thick are utilized, as these are readily available on the market and are well adapted for use in this apparatus. Such plates may be made by mixing granular crystalline alumina with ceramic bond, viz. suitable clays such as ball clay, slip clay and feldspar, shaping and then firing in a ceramic kiln. But other granular material may be used, for example silicon carbide, quartz, or emery, and the bonding material may be varied, for example glass frits may be employed in whole or in part. Various cements might be employed and other bonds, provided the plates are porous and provided the bonds are water, acid and alkali resistant. Since it is necessary to clean the plates at intervals, it is important that they be resistant to acid and alkali cleaning solutions as well as to water. A uniform permeability is much preferred and the "Alundum" plates have this characteristic.

Considering now the supporting structure for the plates 13, I provide a number of bolts 14, metal washers 15 and 16, rubber washers 17, nuts 18 and 19, and knurled bushings 20. I locate the bushings 20 in the bottom of the tank 10 in any suitable manner, for example as disclosed in my prior patent. The bottom of the invention may be installed in preexisting filtration tanks and in many cases it is convenient merely to drill holes in the concrete bottom of the tank, locate the bushings therein and cement them in place with a cold setting cement 21, but in constructing a new tank it will in many cases be found more convenient to place the bushings in the desired positions with regard to spacing, then to pour the concrete bottom around the bushings.

Each plate 13 is supported by three bolts 14 being held in place by the rubber washers 17 which are clamped together by the nuts 18 and the interposed metal washers 15 and 16. As better shown in Figure 1, those plates which are not adjacent the walls of the tank are supported at two corners and at the side opposite the side connecting said corners. Some of each plate is cut away at each of these corners and a recess is made at each of these sides. In that manner the plates 13 are placed in actual abutting contact with each other notwithstanding the fact that the threaded parts of the bolts 14 exend between them, as shown.

In the cases of the plates 13 which abut the end walls of the tank 10, holes 22 may be drilled in the plates, as shown in Figure 3, in order to allow room for the bolts at the ends of the tank. In the cases of certain side rows of plates, one bolt may be slightly spaced from the exact corner, as shown.

While, of course, when new tanks are constructed, they may have inside dimensions in even feet, or exactly divisible by the dimensions of the sides of the plates, in the case of old tanks this may not always be the case. Figure 1 shows fragments of plates at two opposite ends of the tank and these have holes 22 therein for receiving the bolts 14.

The plates can readily be laid starting from one corner of the tank using a spirit level to set them all in horizontal position. The nuts 18 provide a ready vernier adjustment whereby to level each plate exactly. Owing to the three point support of each plate there is no possible danger of setting up a strain in any plate that would cause cracking thereof. Crushing of the plates is prevented by use of the rubber washers 17 which may be and preferably are made of sponge rubber. This permits the nuts 18 to be tightened without danger of crushing the plates. Using the three point support the plates can be laid very fast, whereas use of a four point support system as shown in my prior patent necessitates a tedious sequence of readjustments to bring all the plates to a level.

After the plates have been leveled and firmly clamped in position, a plastic composition 25 is poured hot into all of the joints thus effectively sealing the joints. This plastic composition 25 is laid in the joints between the walls of the tank 10 and the marginal plates. A preferred method of sealing the joints may be to butter the edges of the plates with a plastic compound when they are laid, this to be followed by pouring after the plates are leveled as described above.

It will thus be seen that there has been provided by this invention an apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth, or shown in the accompanying drawing, is to be interpreted as illustrative and not in a limiting sense.

I claim:

In apparatus of the class described, a porous plate of granular refractory material bonded with a bond resistant to water, acid and alkali, into a strong but porous plate which is substantially rectangular in shape, exactly three and no more bolts perpendicular to the plate, nuts on the upper end of the bolts, resilient washers on each side of the plate on each bolt, the nuts being outside of the washers and forcing them into engagement with the plate, two bolts being located at corners of the plate and the third bolt being located at the side opposite the side connecting said corners, the plate being cut away at said corners and said side opposite said corners whereby the bolts are partially within the area of the plate.

THOMAS R. CAMP.